Patented Jan. 20, 1942

2,270,255

UNITED STATES PATENT OFFICE 2,270,255

SELENOTRICARBOCYANINE DYES

Leslie G. S. Brooker, Rochester, N. Y., assignor, by mesne assignments, to Eastman Kodak Company, Rochester, N. Y., a corporation of New Jersey No Drawing. Original application January 16, 1933, Serial No. 651,870. Divided and this application March 3, 1936, Serial No. 66,859

12 Claims. (Cl. 260—240)

This invention relates to cyanine dyes and more particularly to selenotricarbocyanine dyes or salts which can also be called selenatricarbocyanine dyes or salts in accordance with my more recent proposals for the nomenclature of cyanine dyes.

This application is a division of my co-pending application Serial No. 651,870, filed January 16, 1933, now United States Patent 2,189,599, dated February 6, 1940, dealing with a new method for the preparation of cyanine dyes which comprises carrying out cyanine dye condensations in the presence of strong organic bases, i. e., organic bases having a dissociation constant substantially greater than that of pyridine. By my new method described in the above referred to co-pending application, substantial increases in yields of dyes can be obtained. In fact, my new method allows of the preparation of certain cyanine dyes heretofore unattainable.

It is the object of the instant invention to provide selenotricarbocyanine dyes. These dyes are particularly useful as sensitizers for photographic emulsions, increasing the range of sensitivity thereof.

I have found that selenotricarbocyanines can be prepared by condensing two molecular proportions of a quaternary salt of a 1-methylbenzoselenazole base with one molecular proportion of a condensation product of glutaconic aldehyde and a primary or secondary amine, in the presence of a strong organic base, such as triethylamine, piperidine, triethanolamine, n-butylamine, diethylamine, β-diethylaminoethyl alcohol, and the like. Guanidine carbonate is also useful.

The following example serves to illustrate the preparation of one of my new dyes. This illustration is not intended, however, to limit my invention in any way except as indicated in the appended claims.

EXAMPLE

*2,2'-diethylselenotricarbocyanine bromide*

2 parts (2 mols.) of 1-methylbenzoselenazole are heated for a day with 2 parts (2 mols.) of ethyl p-toluenesulfonate at 100°. The product is dissolved in 12 parts of absolute ethyl alcohol, the solution chilled in ice-water, 1.4 parts of glutaconic aldehyde dianilide hydrochloride added followed by 0.85 part (2 mols.) of piperidine. The dye is rapidly formed and the whole is allowed to stand for several hours at room temperature or somewhat lower. The dye is then precipitated with aqueous potassium bromide, collected, washed clean with water followed by acetone, and purified by recrystallization from methyl alcohol. It separates in beautiful green needles and gives a deep greenish blue solution. This dye can be represented by the following formula:

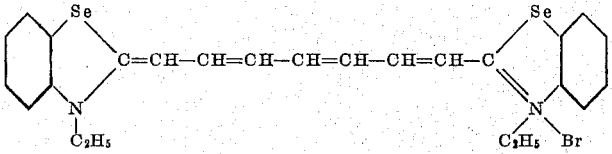

In a similar manner other selenotricarbocyanines can be prepared. The parent bases, such as 1-methylbenzoselenazole, may be substituted in the available positions, but this does not affect or diminish the scope of my invention.

What I claim and desire to be secured by Letters Patent of the United States is:

1. A 2,2'-dialkylselenotricarbocyanine salt.
2. A 2,2'-dialkylselenotricarbocyanine halide.
3. A 2,2'-dialkylselenotricarbocyanine bromide.
4. A 2,2'-dialkylselenotricarbocyanine p-toluenesulfonate.
5. A selenotricarbocyanine salt of the following structure:

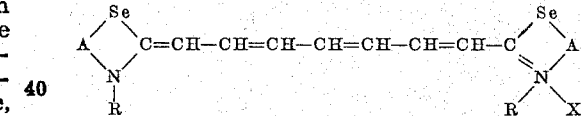

wherein A represents a phenylene group, R represents an alkyl group and X represents an acid radical.

6. A 2,2'-diethylselenotricarbocyanine salt.
7. A 2,2'-diethylselenotricarbocyanine halide.
8. 2,2'-Diethylselenotricarbocyanine bromide.
9. 2,2'-Diethylselenotricarbocyanine p-toluenesulfonate.
10. A selenotricarbocyanine salt.
11. A selenotricarbocyanine bromide.
12. A selenotricarbocyanine p-toluenesulfonate.

LESLIE G. S. BROOKER.